Nov. 3, 1931. W. E. DUNBAR 1,830,353
BRINE CONTROL FOR WATER SOFTENING SYSTEMS
Filed June 24, 1929 3 Sheets-Sheet 1
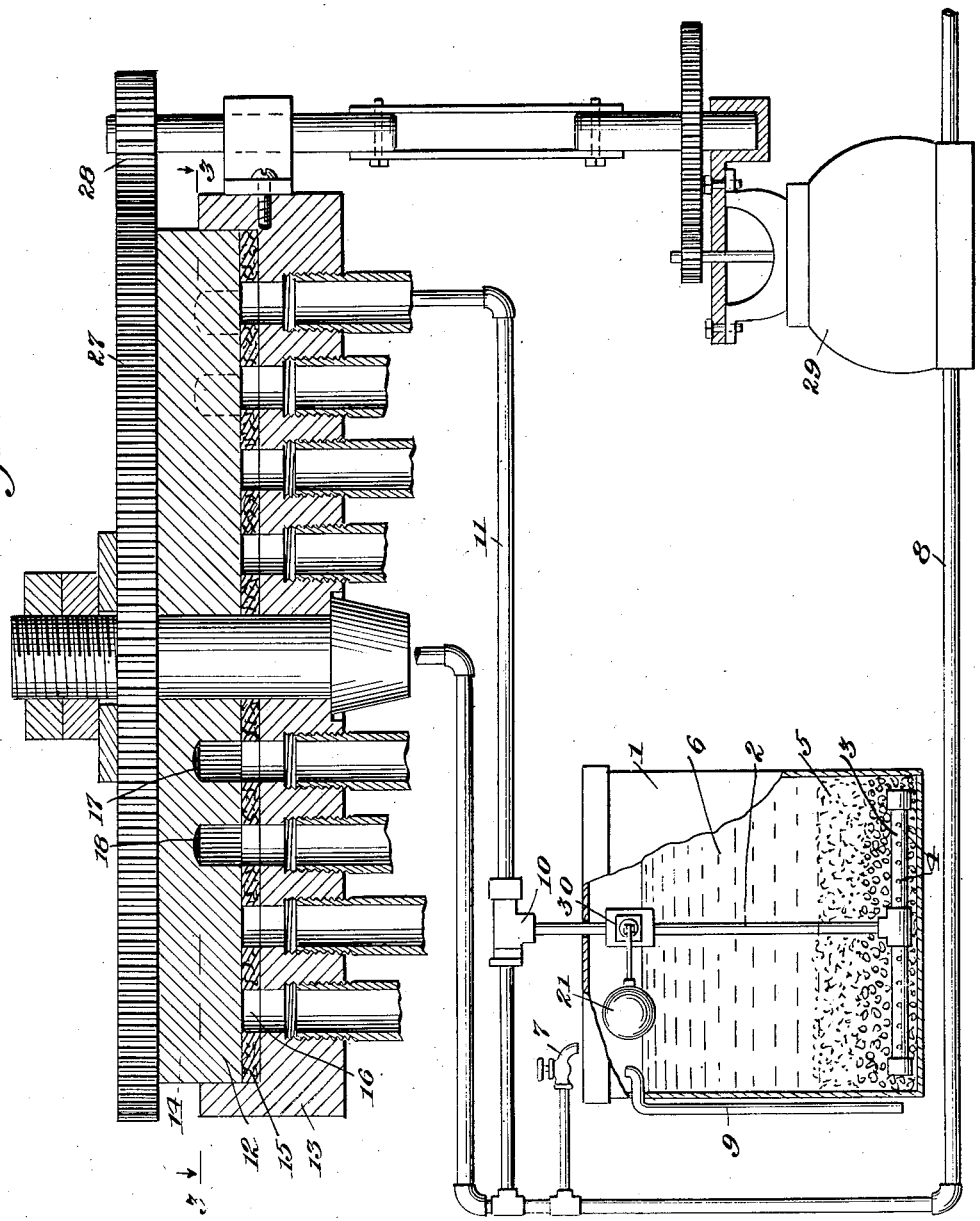
Inventor:
W. E. Dunbar,
by
Atty Nov. 3, 1931.  W. E. DUNBAR  1,830,353
BRINE CONTROL FOR WATER SOFTENING SYSTEMS
Filed June 24, 1929  3 Sheets-Sheet 2
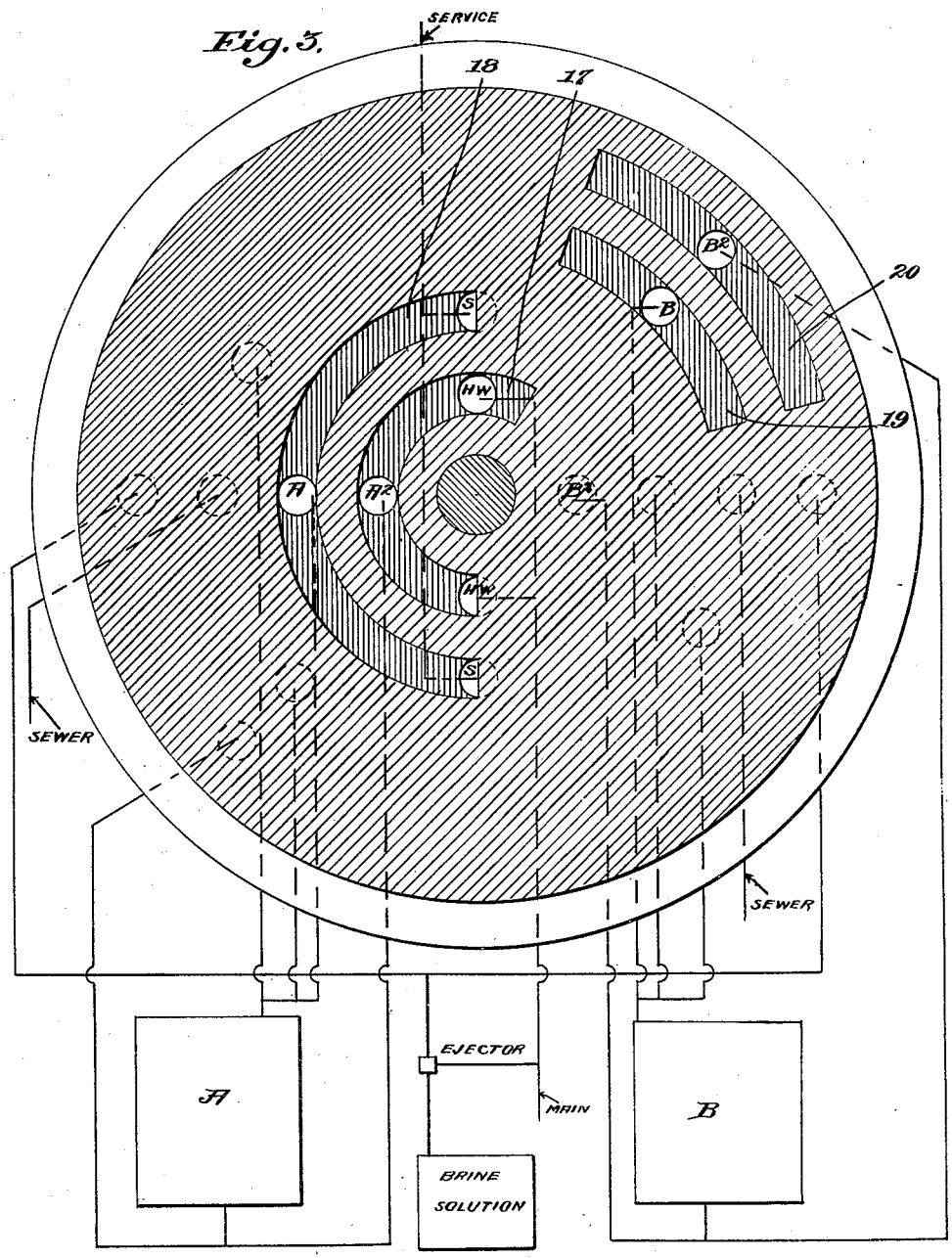

Patented Nov. 3, 1931

1,830,353

UNITED STATES PATENT OFFICE

WILLIAM E. DUNBAR, OF JACKSONVILLE, FLORIDA

BRINE CONTROL FOR WATER SOFTENING SYSTEMS

Application filed June 24, 1929. Serial No. 373,343.

This invention relates to systems for water softening of that type which operate by the use of permutits, and which appertains particularly to apparatus for the control of the brine by which the permutits are regenerated.

The invention is equally applicable to single tank systems in which during the regenerative period, the continuity of the soft water supply is interrupted, or to plural tank systems which are alternately regenerated for making available a continuous supply of softened water.

The present invention may also be equally applied to a system in which the brine is automatically supplied to the permutits, or to one in which the brine is supplied by a manual means.

The invention has for its chief object the provision of means for controlling the flow of brine to the regenerating tank or tanks, irrespective of the duration of the period of communication of the brine tank with the regenerator, so that only a determined and limited quantity of brine shall flow into the system at each regenerative period, even though through inadvertence or for other causes, the brine tank shall be left in communication with the regenerating tanks.

Other objects of the invention will appear as the following description of exemplary embodiments thereof proceeds.

The invention, by ways of example, is described in connection with a dual tank upflow system similar to that disclosed as the second modification of my invention described and claimed in my copending application Serial No. 361,482 filed May 8, 1929, excepting that a disc valve is employed instead of a frusto-conical barrel valve, and the connections to said valve being accordingly modified.

In the present drawings,

Fig. 1 is a side elevation partly in section showing the device of my invention in connection with a distributing valve and a water meter, the latter serving as the motor for actuating the distributing valve.

Fig. 3 is a section taken along the line 3—3 of Fig. 1 viewed in the direction of the arrows, the same being shown diagrammatically connected into the dual tank system.

Figure 4:
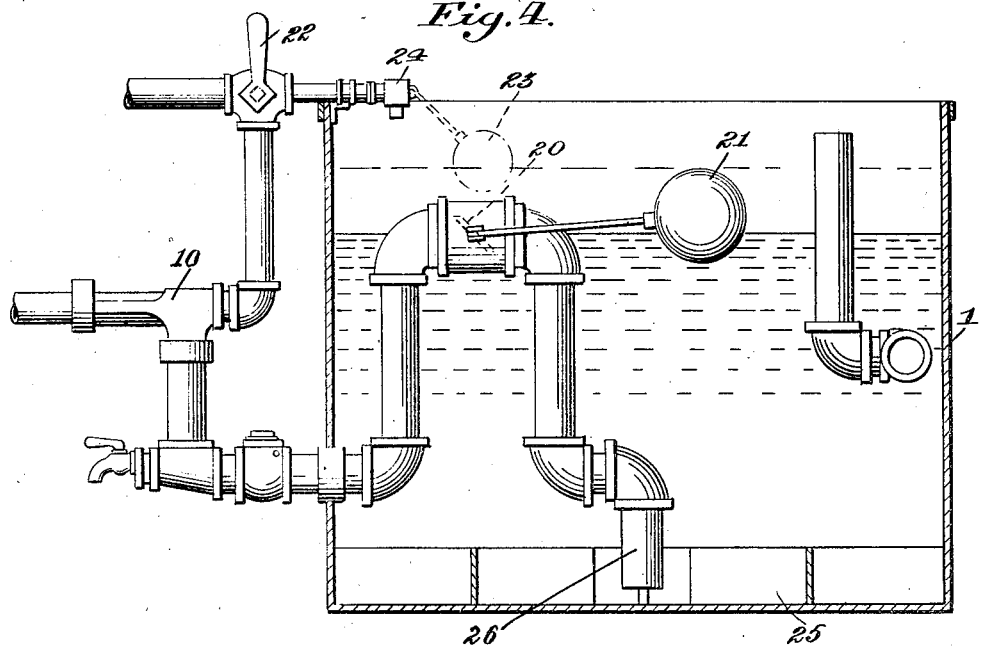
Fig. 4 is a view in vertical section of a modified form of the invention in which the automatic distributing valve is not employed, the admission of brine to the system being controlled by hand.
Figure 2:
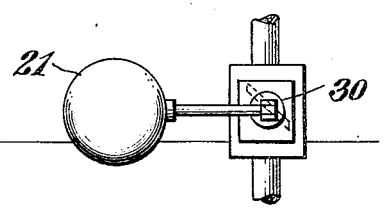
Fig. 2 is a detail view in vertical section showing the float actuated brine control valve.

Referring now in detail to the several figures in which similar parts are referred to by the same characters of reference, and first adverting to that form of the invention shown in Fig. 1, the numeral 1 represents the brine tank comprising a receptacle having a pipe 2 extending to a point adjacent the bottom of said tank and being preferably connected to branch pipes 3 lying near the bottom of said tank and provided with numerous perforations 4. The branch pipe 3 is designed to be buried under a mass of salt 5 and above the salt is a body of water 6 which percolates the salt dissolving the same and forming a very strong brine in that zone in which lies the branch pipes 3. Fresh water is, from time to time as the exigencies of use may require, admitted to the tank 1 by means of the spigot 7 which is connected to the hard water supply pipe 8. An overflow pipe 9 is provided having its upper open end terminating adjacent the level of the maximum quantity of water which is deemed proper to carry in the tank 1. If the spigot is left on too long, the water in the tank will rise to such a height as to overflow by way of the pipe 9, discharging into a suitable drain. It will be understood that in the ordinary operation of the softening system, the spigot 7 will only be open sufficiently to provide a small trickle of water to the tank 1 since the brine discharge occurs infrequently. Consequently the amount of overflow through the pipe 9 will always be small and on account of the difference in density between fresh and salt water, the liquid at the upper level in the tank 1 will be fresh so that practically no brine is wasted in this overflow.

An automatic ejector 10 is provided, communicating with the pipe 2 and with the hard water supply, by means of a pipe 11, and when the distributing valve 12 is in such a position as to open communication between the pipe 11 and one of the softener tanks, the flow of hard water through the pipe 11 entrains some of the strong brine which is drawn up from the bottom of the tank 1, said brine being diluted by the hard water so that a brine solution of the proper strength is admitted to the softener tank.

What has been described up to the present point is already known in water softening systems, and before adverting to the novel features of the present invention the operation of the softener system will be briefly described.

It will be seen, referring to Fig. 3 that there are two softener tanks A and B. Each of these contains a body of zeolites or other suitable permutits. Pipes communicate both with the bottom and top of each tank, above and below the body of zeolites. For convenience in identifying the several pipes with the valve ports as shown in Figs. 1 and 3 on the one hand, and with the respective ends of tanks A and B on the other hand, the reference characters of those pipes entering the tops of the softening tanks will be without exponent while those entering the bottom of the softening tanks will be designated by the exponent "2."

The system here shown is of the "up-flow" type in which hard water is admitted from the service main to the bottom of the tanks, passing through the body of zeolites, becoming softened by base exchange with the zeolites, issuing from the upper surface of the bodies of zeolites as soft water, and discharging as such through suitable service pipe. After a certain period of time the zeolites become inactive through satisfaction of their affinity for the mineral base carried by the hard water and it becomes necessary to regenerate them. The sequence of operations with respect to the two tanks is conducted in such a manner that the zeolites become alternately exhausted in their respective tanks and alternately regenerated. During the regeneration period the communication of the tank about to be regenerated, with the soft water service, is cut off and the up-flow of hard water is substituted by an up-flow of brine obtained as has been heretofore explained by the ejector 10 from the brine tank 1. After a certain time the zeolites become regenerated, the brine flow is cut off, a flow of hard water succeeds it, the upper part of the tank being regenerated being in communication with a suitable drain or sewer both during the brine treatment and the washing period which follows it. After all trace of free brine has been removed from the tank under regeneration, the drain or sewer connection is cut off and the soft water service is again placed into communication with the upper part of said tank. While the regenerative phases are taking place in one tank the other is performing its normal function of softening the hard water which passes through the body of zeolites.

The distributing valve 12 by which the functions of each tank are sequentially determined and the tanks alternately served comprises a stationary body 13 connected by various conduits with the tops and bottoms of the respective tanks A and B. A rotatable disc 14 coacts with the body 13, a packing gasket 15 intervening, said gasket, in the present instance, being fixed with respect to the body 13 and being provided with perforations 16 in permanent registry with the conduits. The disc 14 is provided on its lower face with concentric arcuate channels 17, 18, 19 and 20 arranged in different zones and suitably angularly displaced, said channels being adapted to ride over certain of the ports in the gasket 15 in the course of rotation of the valve, and at suitable intervals and in certain positions of the disc 14, to connect pairs of these ports for carrying out the functions of the system.

In the innermost zone are the pair of ports designated by the letters HW. These as may be seen from Fig. 3 are connected to the water main and bring hard water to the softener. The channel 17 brings one or the other or both of these ports into communication with the ports $A^2$ and $B^2$, which lead to the bottoms respectively of the tanks A and B. At the same time, it will be noted that in the next zone the ports designated by the character S are in communication by way of the channel 18 with the port A communicating with the top of the tank A. In the position of the valve as shown, tank A is functioning as a softener, the hard water being admitted at the bottom and the soft water being available at the top. At this time the channels 19 and 20 register with ports B and $B^2$ leading respectively to the top and bottom of tank B, but since the channels are not in registry with any other ports, tank B is cut off from activity with the rest of the system and is, therefore, in a closed state preparatory to the beginning of the regenerating operation. It is obvious, that if the valve moves a little further in clockwise direction the channels 19 and 20 will place the ports B and $B^2$ into communication respectively with the waste pipe and brine inlet, at which time the regenerative process will begin.

The valve 12 is actuated through reduction gearing comprising a train of gears 27 and 28, the latter gear being driven by the water meter 29. Hard water is supplied to the water softening system whenever soft water is being withdrawn therefrom or whilesoever the brine inlet is in communication through one or the other of the softening tanks with the waste pipe or sewer. At these times the meter rotates, and consequently it is at these times that the valve is driven. Now, it may so happen that enough soft water is drawn to rotate the valve to a point at which the brine inlet is placed in communication with the waste pipe through one of the softening tanks. The soft water may be turned off but this will not stop the operation of the meter since there is still a discharge passage for the hard water through the ejector pipe 11, brine inlet, softening tank, to the sewer. Under these conditions it is possible that an excessive quantity of brine would discharge through the system before the meter had turned the valve to a position in which the brine inlet is cut off. This is one of the conditions which the present invention has been designed to meet.

The invention comprises in addition to so much of the structure of the system as may be necessary to ensure the carrying out of its functions, a valve 30 in the pipe 2 and a float 21 for actuating said valve, said float normally maintaining the valve open but closing said valve upon a predetermined drop in the level of liquid in the tank 1. This drop in level corresponds to the amount of concentrated brine discharged into the system and it may be regulated according to the needs or capacity of the system with which it is used. No matter how long the distributing valve 12 may remain with the brine inlet open to either of the softening tanks, an amount of brine equal to the drop of the level of liquid in the tank 1 from the open to closed position of the valve 30 will enter the system, and then substantially no more will enter until the level of liquid has been restored in the tank 1 preparatory to the next regeneration. The word "substantially" is advisably used since the valve 30 will not remain absolutely closed, for so long as there is a trickle from the spigot 7 and it is preferably arranged so as to discharge very slowly, continuously, the level of liquid in the tank 1 will be slightly raised, lifting the float and slightly opening the valve 30, the latter remaining open at such a degree as will permit the discharge of liquid at the rate at which it enters the tank 1. In view of the slow replenishing of the tank 1, the waste is negligible.

When finally the valve 12 has rotated to such point as to close the brine inlet, then the level of liquid in the tank 1 will gradually build up to its normal full level, in readiness for another regenerative discharge, the fresh water at the upper level overflowing, if need be, through the pipe 9.

A form of invention is illustrated in Fig. 4 which is adapted to a single tank system and in which the regenerating supply of brine to the system is manually controlled. In this form of invention, the tank 1 is provided with an ejector adapted to be put into communication with the pressure water supply but normally cut off from said water supply by the three-way cock 22. This cock may be turned manually to such position as to place the pressure water supply into communication with the interior of the tank 1. Water may thus be admitted until the desired high level of liquid within the tank is reached, at which point the water may be turned off manually or preferably, the level is automatically determined by means of the float 23 which operates to close a valve 24. Below the tank 1 is a sump 25 into which the solution of greatest density gravitates and from which it is discharged through the pipe 26 when the ejector is in operation. By turning the three-way cock 22 so as to connect the water supply with the ejector, the flow of brine is initiated and continues until the cock 22 is manually cut off. It is obvious that if through forgetfulness or for any other reason the operator neglects to turn off the cock 22, all the brine in the tank 1 will be depleted. This may amount to great waste. In order to prevent such waste, the valve 30 and float 21 are applied to the pipe 26 automatically determining the low level in the tank 1 at which the flow of brine induced by the ejector shall be cut off. For convenience in installing the float and valve, and for the purpose of keeping the float and its attendant parts out of that part of the brine of greatest concentration, the pipe 26 is bent up to an inverted U-shape so as to place the valve near the level of the liquid, where the solution is of small concentration.

It is to be understood throughout the specification and claim that the term "salt" and "brine" are not restricted respectively to sodium chloride and an aqueous solution of the same but that these terms are generic respectively to any softening agent capable of performing base exchange with the zeolites, and these agents in solution.

While I have in the above description endeavored to claim what I believe to be a preferred and practical application of my invention, it is to be understood that the details of construction as disclosed are merely by way of example and that the invention is not limited other than by the terms of the appended claim.

What I claim is:

In a water softening system of that type requiring the periodic regeneration of the softening agent by means of brine, a brine tank adapted to contain a mass of salt, and water forming a salt solution, means for causing the periodic discharge of brine from said tank to said system, means adapted to admit continuously a relatively small flow of fresh water to replenish the depletion of brine in said tank caused by said discharge, and means responsive to a lowering liquid level in said tank for diminishing the brine discharge to a rate but slightly greater than that of the inflow of fresh water to said tank, when the liquid in said tank reaches a predetermined low level.

In testimony whereof I have signed my name to this specification.

WILLIAM E. DUNBAR.